June 24, 1941.  H. SAUER  2,246,817
PHOTOMETER
Filed Oct. 12, 1938  2 Sheets-Sheet 1
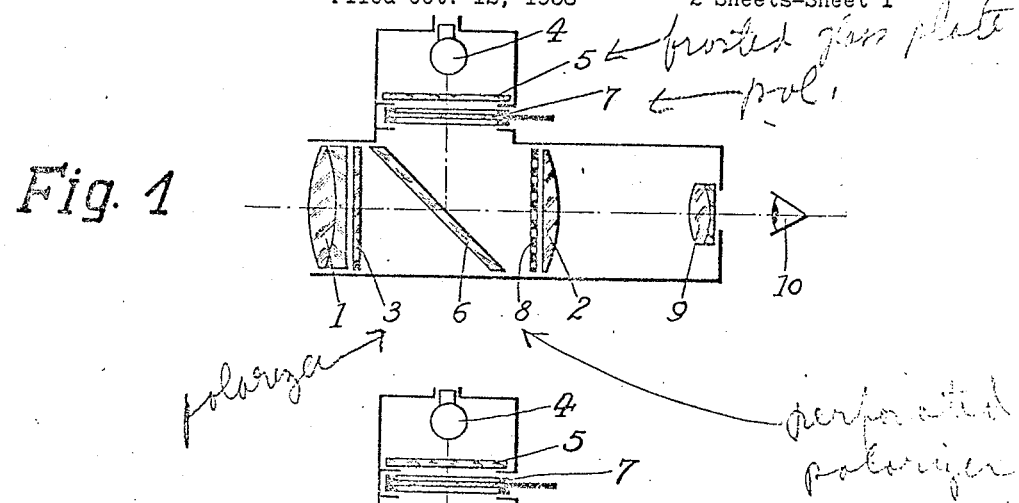
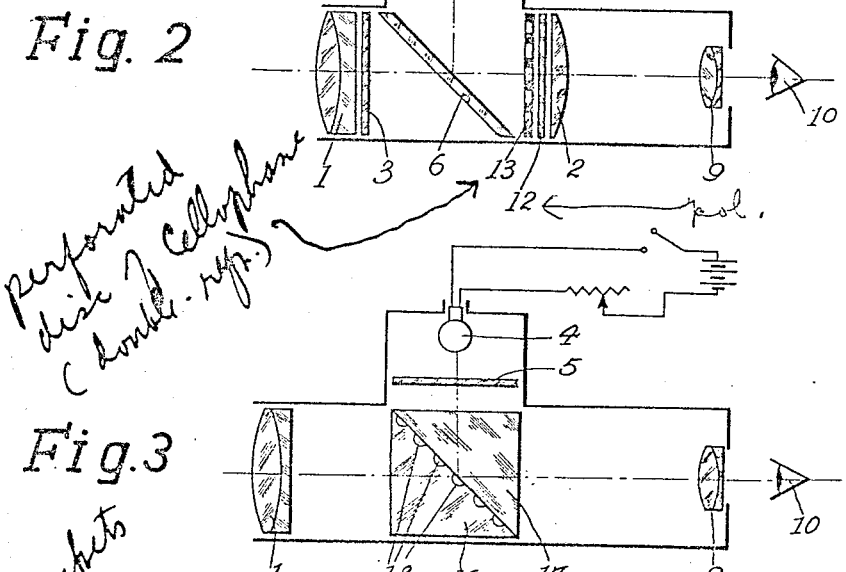
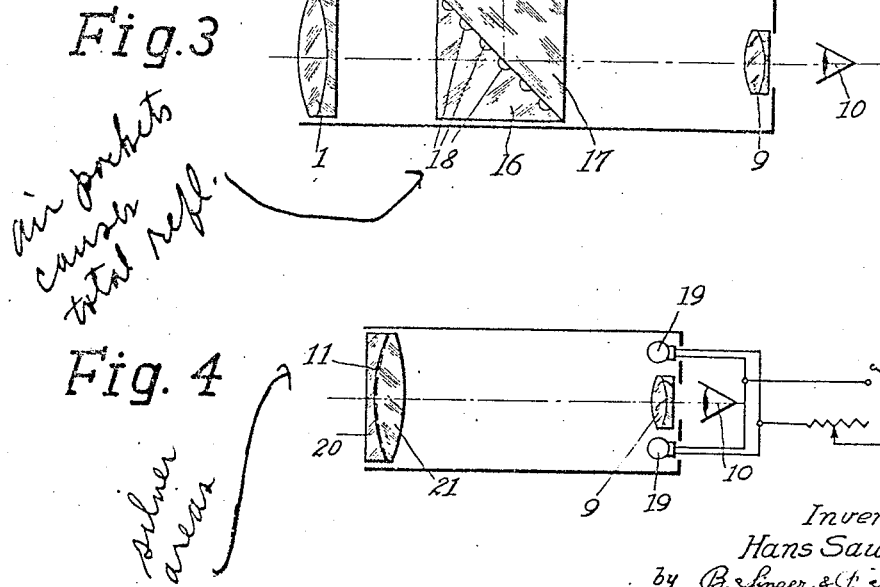
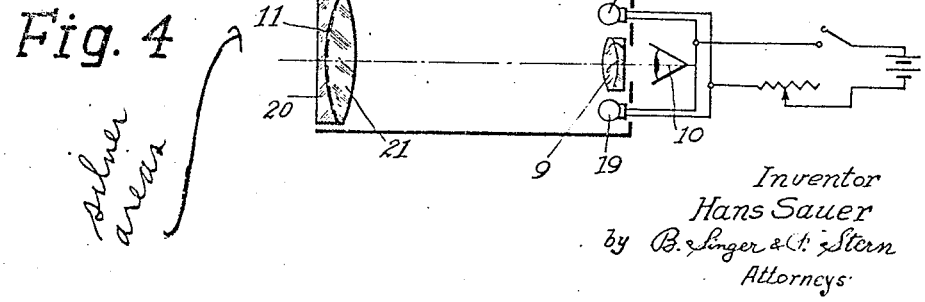
Inventor
Hans Sauer
by B. Singer & Ct. Stern
Attorneys

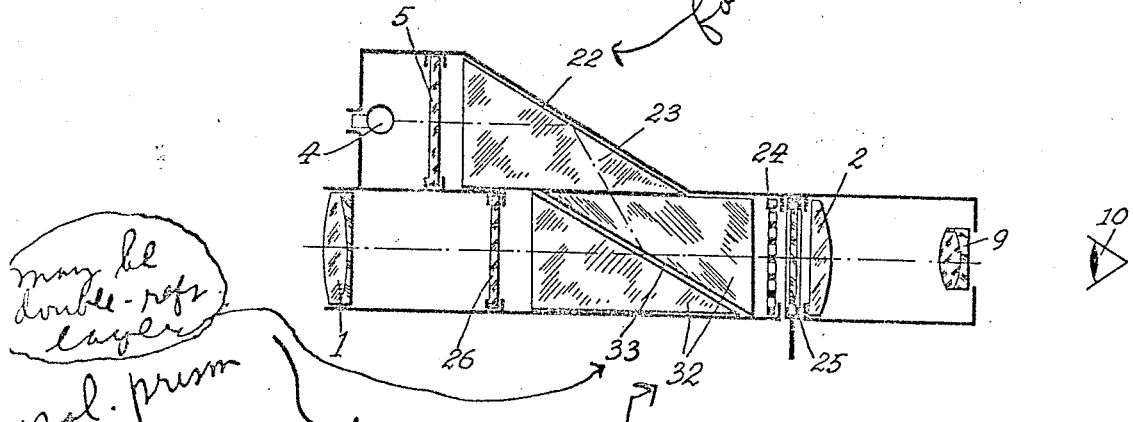
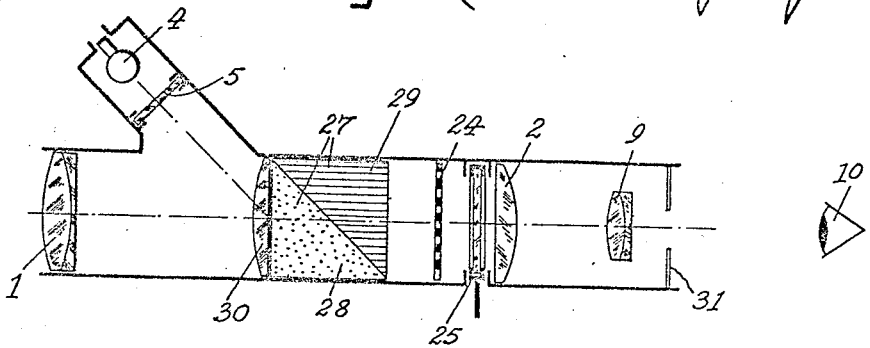

Patented June 24, 1941

2,246,817

UNITED STATES PATENT OFFICE 2,246,817

PHOTOMETER

Hans Sauer, Dresden, Germany, assignor to Zeiss Ikon Aktiengesellschaft, Dresden, Germany Application October 12, 1938, Serial No. 234,705
In Germany October 18, 1937

5 Claims. (Cl. 88—23)

The invention relates to improvements in photometers, and particularly is directed to that type of photometers which are employed as photographic exposure meters.

It is an object of the present invention to employ a photometer of the comparison type as a device for determining the exposure time when taking photographic or cinematographic pictures. In photometers of the comparison type a surface illuminated by light coming from the scene to be photographed is compared with a surface illuminated by light whose intensity is known or standardized. In determining the exposure time, the illumination of one of the two surfaces is adjusted by means of diaphragms, gray filters etc. until both surfaces appear uniformly illuminated.

The photometers heretofore employed permit only a measurement of the average brightness of the scene to be photographed. If it is desired to measure the brightness of certain parts or points of the scene, the viewing angle of the photometer would have to be made very small so as to receive only the light reflected from a small portion of the scene, and then has to be pointed successively to the various points of the scene to be measured. Such a mode of measuring, however, is confusing and complicated.

It is therefore another object of the invention to provide a photometer for determining the exposure time for photographic pictures, in which the brightness of individual points of the scene to be photographed can be judged at a glance without moving the photometer from one position to another. This is accomplished by distributing over the entire area of the image appearing in the photometer a large number of small comparison areas illuminated by a standardized lamp or the like. The distribution of these illuminated areas may be regular or irregular. It is now possible to judge the brightness of individual parts or points of the scene with respect to the average brightness of the scene as a whole. Depending upon the condition whether the exposure time is to be determined with regard to the high lights or shades in the scene, the brightness of the light spots or dark spots will be measured. The exposure meter of the present invention can be used for such measurements without any difficulties, because there are provided numerous illuminated areas for comparison throughout the entire area of the image of the scene appearing in the photometer.

Other objects of the invention will be apparent or will be specifically pointed out in the description forming a part of this specification. The invention, however, is not limited to the embodiments herein described, as various other forms may be adopted within the scope of the claims.

Referring to the drawings:

Fig. 1 illustrates diagrammatically a photometer in accordance with the present invention, and Figs. 2 to 6 illustrate diagrammatically each a different embodiment of the invention.

Fig. 1 illustrates an exposure meter in which the objective 1 projects an image of the scene to be photographed onto the frosted plane face of the lens 2. A polarizing filter 3 is mounted in rear of the objective 1 for linearly polarizing the light passing through the objective 1 and striking the plane face of lens 2. The light emitted from the source of light 4, which constitutes the comparison illumination, passes through a frosted glass plate 5 and a polarizing filter 7 to an angularly positioned glass plate 6 which reflects the polarized light toward the lens 2. The polarizing filter 7 is rotatable and in its zero position the polarizing plane of the filter is at a right angle with respect to the polarizing plane of the filter 3. In such a case the plane of vibration of the light passing through the objective 1 will be at a right angle to the plane of vibration of the light used for comparison.

A perforated polarizing foil 8 is mounted in front of the plane frosted face of the lens 2. The polarizing plane of this polarizing foil 8 is at a right angle to that of the polarizing filter 3. This has the result that the light polarized by the polarizing filter 3 and striking the polarizing foil 8 will be prevented from reaching the frosted plane surface of the lens 2. Only the light rays passing through the apertures of the perforated polarizing foil 8 will reach the lens 2.

Since on the other hand the polarizing plane of the filter 7, in its zero position, is at a right angle to the polarizing plane of the filter 3 and parallel to the polarizing plane of the foil 8, it will be obvious, that the light rays emitted from the lamp 4 after having been polarized by the filter 7 will pass unhampered through the polarizing portions of the foil 8.

Therefore, there will appear on the frosted plane face of the lens 2 an image of the scene to be photographed dotted with small surface elements, which are only illuminated by the lamp 4. This image is observed by the eye 10 of the photographer through an ocular lens 9.

The adjustment of the brightness of the comparison areas is accomplished by a rotative adjustment of the polarizing filter 7, which in combination with the perforated polarizing foil 8 forms a light diminishing device.

It is also possible to employ a gray filter for diminishing the comparison illumination. Such a gray filter would have to be arranged in such manner that it could be inserted in the light beam emitted by the lamp 4. In such an arrangement the polarizing filter 7 would be fixedly mounted in the exposure meter.

Fig. 2 illustrates a modified embodiment of the exposure meter in which the perforated polarizing foil 8 is substituted by a perforated disc 13 of double refractive material, for instance Cellophane, and a polarizing filter 12 is mounted between the perforated disc 13 and the lens 2. The polarizing planes of the filters 3 and 12 are at right angle to each other. The perforated disc 13 has the effect that the light passing through the objective 1 will pass unhampered through all portions of the polarizing filter 12 in front of which a solid portion of the double refractive material is positioned. The polarized light rays passing through the apertures of the disc 13, however, cannot pass through the filter 12 owing to the fact that its polarizing plane is at a right angle to that of the polarizing filter 3. Only the light rays emitted from the lamp 4 can pass through the apertures of the disc 13 and the polarizing filter 12, because the polarizing planes of the filters 7 and 12 are normally parallel to each other. The light used for comparison may be diminished in the same manner as in Fig. 1 by rotatably adjusting the polarizing filter 7, by the employment of a gray filter and the like, or by varying the current supply of the lamp 4 as illustrated in Fig. 3.

The modification of the exposure meter illustrated in Fig. 3 does not employ polarizing filters, but employs the principle of total reflection. The light passing through the objective 1 passes unrestricted through all portions of the prism 16 and 17 where the latter touch each other at their meeting plane. The ocular 9 permits an observation of the image produced in this manner. It will be noted, however, that the prism 16 is provided with recesses 18 in the surface which engages the prism 17. These recesses 18 form air pockets which cause a total reflection of the light. The surface areas of the prism 17 covering the recesses 18, however, reflect the light coming from the lamp 4 into the eye 10 of the photographer, and the latter will see in the photometer an image of the scene to be photographed dotted with small illuminated areas which form the means for comparison the brightness of any desired point in the image with a standardized source of light. In this embodiment the brightness of the comparison areas is controlled by varying the supply current of the electric lamp 4.

Fig. 4 illustrates an embodiment of the invention, in which the concave face of the concave lens 20 of the objective 20, 21 is provided with a layer 11 composed of a plurality of separate small minute silver areas which layer 11 may also be called a silver screen. The image produced by the objective 20, 21 in the exposure meter is observed through the ocular lens 9 as in the other embodiments. Only those portions of the image produced by the objective 20, 21 are visible, however, which are not covered by the non-transparent silver areas of the layer 11. The non-transparent silver areas are employed for producing in the image of the scene to be photographed numerous comparison areas which are illuminated by the lamp or lamps 19. The light rays emitted from the lamps 19 are reflected by the elementary silver areas into the eye 10 of the photographer.

The light source furnishing the comparison light may be diminishing in the same manner as in the previously described embodiments by employing a gray filter, by controlling the supply current etc.

It is also within the scope of the present invention to change the illumination of the photometric comparison areas step by step in amounts corresponding to the latitude in the light-sensitiveness of the photographic emulsions or the so called film speed. This change in the illumination can be accomplished independent of the gradual variation accomplished for the purpose of equalizing the brightness of an image spot and the comparison areas. In this way it is possible to determine easily whether the distribution of the illumination corresponds to the latitude in the light-sensitiveness of the photographic emulsion.

Furthermore, the photometer may be constructed in such a manner, that the numerous photometric comparison areas distributed over the image area may be differentially illuminated at predetermined amounts, which if desired, are made variable.

While in the embodiment of the invention illustrated in Fig. 3 the light beams to be photometrically compared are combined by total reflection in the same plane, namely in the plane in which the image, provided with the small separately illuminated surface areas, appears, the Figs. 5 and 6 illustrate modifications in which the two steps consisting on one hand in a combination of the two light beams to be photometrically compared and on the other hand in subdividing the image area, take place in different planes. This has the advantage that the finely subdivided photometer area will be positioned at a right angle with respect to the direction of observation, similar to the embodiments of the Figs. 1, 2 and 4.

Referring to Fig. 5, the objective 1 of the exposure meter produces an image of the scene to be photographed on the frosted plane face of the lens 2. The light passing through the objective 1 is linearly polarized by a polarizing prism 32. The prism 32 may be constructed in accordance with the well known prism of Feussner, or Glan, or Glan-Thompson etc. described for instance in the "Lehrbuch der Physik" by Müller-Pouillets, II volume, 2nd part, 1st section, pages 975–980. The light rays of the comparison lamp 4, after passing through the frosted glass plate 5, are reflected by means of a prism 22—by reflection on the face 22 thereof—into the principal polarizing prism 32, so that both beams of light are combined. The light reflected from the scene to be photographed will be polarized by the polarizing prism 32 as already mentioned. The polarization of the light beam emitted from the comparison lamp 4 may be accomplished in various ways.

(1) It is possible to employ as a reflecting prism 22 a so called lime-spar prism of Dove described in the "Zeitschrift für Instrumentenkunde" vol. 7, 1887, page 183. In such a prism that portion of the incoming light beam which is totally reflected by the face 22 will be linearly polarized. The totally reflected, polarized beam of light will be reflected a second time in the polarizing prism 32 and thereby will be combined with the polarized beam of light coming from the scene to be photographed. Both said beams of light are, however, polarized in planes which are at a right angle to each other.

(2) If the principal polarizing prism consists of two glass prism with double refractive layers 33 cemented between the faces forming the hypotenuse (such a prism is for instance proposed by Feussner) then the light reflected from the scene to be photographed is polarized in such a manner by the double refractive material that only one component of the vibration is permitted to pass, while the other component is totally reflected, because the double refractive material for this other component has a smaller index of refraction as that part of the two part prism which faces the objective 1. The comparison light which is reflected into the polarizing prism 32 by total reflection of an ordinary glass prism is correspondingly polarized in such manner that one light component is totally reflected owing to the differences in the refraction indicii between the double refractive material and the prism facing the ocular lens 9, while the other light component passes through the double refractive material. Also in this case two beams of light polarized in different planes are obtained.

(3) It is also feasible to obtain solely a polarization of the comparison light beam by reflection on the face 22 of the reflection prism 23. In such a case it would be necessary to prevent during the second reflection in the principal prism a change of the polarizing plane or a disappearance of the polarized state.

In the modification of Fig. 5 a perforated polarizing foil 24 is employed whose polarizing portion is used for extinguishing the light coming from the scene to be photographed. The light coming from the scene can only pass through the apertures of the foil 24, while the light coming from the lamp 4 is able to pass through the polarizing substance of the foil. The perforated polarizing foil 24 may also be replaced by another perforated polarizing foil in which the apertures are closed by a polarizing substance whose polarizing plane is preferably at a right angle to that of the foil body. A polarizing filter 25 is rotatable adjustably mounted between the perforated polarizing foil 24 and the lens 2 for diminishing the light so that the illumination of the two area sections of the photometer may be equalized. It is, however, advisable to mount the polarizing filter 25 between the polarizing prism 32 and the polarizing foil 24 or between the lens 2 and the ocular lens 9, in order that the polarizing foil 24 may be mounted as close to the lens 2 as possible.

In case the light coming from the scene or the comparison lamp respectively, is already polarized, it is possible to remove such a polarization by inserting in the path of the light in front of the optical members of the photometer either a frosted glass plate, a lime-spar wedge or a λ/4 member. The employment of a frosted glass plate, however, is only recommended for the comparison light beam, because the employment of a frosted glass plate in the light beam coming from the scene would cause an obliteration of the contours of the image.

In the modification illustrated in Fig. 6 the polarizing prism 27 is constructed in accordance with the prism of Rochou, described in the "Lehrbuch der Physik" by Müller-Ponillets, II vol. 2nd part, 1st section, pages 976–977. This prism is composed of two lime-spar prism 28, 29. The optical axis of the prism 28 extends vertically with respect to the plane of the drawing, and the optical axis of the prism 29 lies in the plane of the drawing parallel to the optical axis of the photometer. The two light beams coming from the scene to be photographed and from the comparison lamp 4 respectively, after passing through the field lens 30 are polarized in such manner that their polarizing planes are at a right angle to each other. In this embodiment there is also mounted a perforated polarizing foil 24 in rear of the polarizing prism 27, for the same purpose as in Fig. 5. A polarizing filter 25 is also employed for diminishing the illumination. The secondary images produced on account of the polarization are extinguished by means of a diaphragm 31 at the ocular lens 9. The polarizing prism of Rochou may also be substituted by a prism of Senarmont or Wolaston.

What I claim is:

1. In a photometer of the comparison type, particularly for photographic purposes, an objective for producing in a plane spaced behind the same an image of the object to be photographed, a source of light for illuminating an area whose brightness is to be compared with that of said image, and means for subdividing said comparison area into a plurality of separate area elements and distributing the same over the area of said image, said means including a polarizing filter in rear of said objective, a polarizing filter in the path of the light rays emitted by said source of light, and a perforated polarizing filter in front of the plane in which said image appears, said first and last named polarizing filters having their polarizing planes at a right angle to each other.

2. In a photometer of the comparison type, particularly for photographic purposes, an objective for producing in a plane spaced behind the same an image of the object to be photographed, a source of light for illuminating an area whose brightness is to be compared with that of said image, and means for subdividing said comparison area into a plurality of separate area elements and distributing the same over the area of said image, said means including a polarizing filter in rear of said objective, a polarizing filter in the path of the light rays emitted by said source of light, a polarizing filter in front of the plane in which said image appears, and a disc provided with perforations and made of double refractive material in front of said last named polarizing filter, said first and last named polarizing filters having their polarizing plane arranged at a right angle to each other.

3. In a photometer of the comparison type, particularly for photographic purposes, a lens having a plane frosted face, an objective for producing on the plane frosted face of said lens an image of the object to be photographed, an ocular lens for observing the image on said frosted face, a source of light for illuminating an area whose brightness is to be compared with that of said image, a semi-transparent reflector for reflecting the light from said area onto the frosted face of said lens, said reflector being mounted between said objective and said last named lens, and means for subdividing the light coming from said comparison area into a plurality of separate area elements, whereby the entire area of the image appears to be dotted with illuminated area elements whose brightness permit a comparison with the brightness of any selected area element of said image, said means including a polarizing filter in rear of said objective, a polarizing filter in the path of the light rays emitted by said source of light and a perforated polarizing filter in front of the lens having said plane frosted face, said first and last named polarizing filter having their polarizing planes at a right angle to each other.

4. In a photometer of the comparison type, particularly for photographic purposes, a lens having a plane frosted face, an objective for producing on the plane frosted face of said lens an image of the object to be photographed, an ocular lens for observing the image on said frosted face, a source of light for illuminating an area whose brightness is to be compared with that of said image, a semi-transparent reflector for reflecting the light from said area onto the frosted face of said lens, said reflector being mounted between said objective and said last named lens, and means for subdividing the light coming from said comparison area into a plurality of separate area elements, whereby the entire area of the image appears to be dotted with illuminated area elements whose brightness permit a comparison with the brightness of any selected area element of said image, said means including a polarizing filter in rear of said objective, a polarizing filter in the path of the light rays emitted by said source of light and a perforated polarizing filter in front of the lens having said plane frosted face, said first and last named polarizing filter having their polarizing planes at a right angle to each other, while the polarizing filter associated with said source of light is adjustably mounted for varying the position of its polarizing plane, thereby varying the brightness of the comparison area elements.

5. In a photometer of the comparison type, particularly for photographic purposes, an objective for producing in a plane spaced behind the same an image of the object to be photographed, a source of light for illuminating an area whose brightness is to be compared with that of said image, means for reflecting the light from said comparison light onto said image, and means in front of the plane in which said image appears for subdividing the reflected light beam before it reaches said plane into a plurality of separated light beams, each of which illuminates a small area of said plane, said areas appearing distributed over the entire area covered by the image of the object to be photographed, said last named means including a disc provided with perforations and of a light polarizing material mounted in front of the plane in which said image appears, and polarizing means in front of said disc and in the path of the beam of light producing said image and in the path of the light rays coming from said source of light respectively, said polarizing means causing the light rays in said two paths to vibrate in planes at a right angle to each other.

HANS SAUER.